United States Patent
Matsuda

[19]

[11] Patent Number: 5,833,328
[45] Date of Patent: Nov. 10, 1998

[54] BRAKE CONTROL METHOD IN VEHICLE

[75] Inventor: Shohei Matsuda, Wako, Japan

[73] Assignee: Honda Giken Kogyo Kabushiki Kaisha, Tokyo, Japan

[21] Appl. No.: 751,772

[22] Filed: Nov. 13, 1996

[30] Foreign Application Priority Data

Nov. 16, 1995 [JP] Japan .................................. 7-298198

[51] Int. Cl.$^6$ .................................................. B60T 8/60
[52] U.S. Cl. .......................... 303/150; 303/121; 701/80
[58] Field of Search .................................. 303/121, 150, 303/149, 148, 169, 199, 162, 115.2, 186, 187, 188, 189; 180/197; 364/426.025, 426.015, 426.018; 701/80, 78, 74, 71

[56] References Cited

U.S. PATENT DOCUMENTS

| 5,123,715 | 6/1992 | Okubo | 303/150 |
| 5,466,054 | 11/1995 | Okazaki | 303/149 |

FOREIGN PATENT DOCUMENTS

4-362453  12/1992  Japan .

*Primary Examiner*—Douglas C. Butler
*Attorney, Agent, or Firm*—Nikaido Marmelstein Murray & Oram, LLP

[57] ABSTRACT

A vehicle includes a plurality of axles including front and rear axles on which wheels are mounted at opposite ends thereof, wheel brakes mounted to the wheels, wheel speed detectors for detecting wheel speeds of the wheels, actuators for operating the wheel brakes, and a friction coefficient determining device for determining a friction coefficient of a travel road surface based on detection values detected by the wheel speed detectors. When each of the wheels is braked, the operations of the actuators are controlled such that braking forces are generated only in the wheel brakes in one of the axles at least at an initial stage of the braking, and the determination of the friction coefficient by the friction coefficient determining device is carried out at the initial stage. Thus, the determination of the friction coefficient by the friction coefficient determining device is more facilitated.

4 Claims, 6 Drawing Sheets

BRAKE CONTROL METHOD IN VEHICLE

BACKGROUND OF THE INVENTION

1. Field of the Invention

The present invention relates to a brake control method in a vehicle including a plurality of axles including front and rear axles on which wheels are mounted at opposite ends thereof, respectively, wheel brakes mounted to the wheels, wheel speed detectors for detecting wheel speeds of the wheels, actuators for operating the wheel brakes, and a friction coefficient determining means for determining a friction coefficient of a travel road surface based on detection values detected by the wheel speed detectors, wherein the brake control method is suited to the determination of a friction coefficient by the coefficient determining means.

2. Description of the Related Art

Such vehicle is known, for example, from Japanese Patent Application Laid-open No. 4-362453.

In the friction coefficient determining means in the known vehicle, reference values are determined in view of a slip rate in addition to a vehicle speed presumed based on detection values detected by the wheel speed detectors during traveling of the vehicle, and a friction coefficient of a travel road surface is determined by comparison of the reference values with detection values detected by the wheel speed detectors. However, braking forces are simultaneously generated in all of the wheel brakes upon braking and hence, it is not that a variation in behavior of each wheel is relatively small and the friction coefficient is easily determined.

SUMMARY OF THE INVENTION

Accordingly, it is an object of the present invention to provide a brake control method in a vehicle in which the friction coefficient is more easily determined by the friction coefficient determining means.

To achieve the above object, according to a first aspect and feature of the present invention, there is provided a brake control method in a vehicle including a plurality of axles including front and rear axles on which wheels are mounted at opposite ends thereof, respectively, wheel brakes mounted to the wheels, wheel speed detectors for detecting wheel speeds of the wheels, actuators for operating the wheel brakes, and a friction coefficient determining means for determining a friction coefficient of a travel road surface based on detection values detected by the wheel speed detectors, wherein when each of the wheels is braked, the operations of the actuators are controlled such that braking forces are generated only in the wheel brakes in one of the axles at least at an initial stage of the braking, and the determination of the friction coefficient by the friction coefficient determining means is carried out at the initial stage.

With the first feature of the present invention, the wheel speeds in the axle which is in a non-braked state can be utilized as reference values for the determination of the friction coefficient, and the wheel behavior can be relatively increased to facilitate the determination of the friction coefficient, while assuring a lateral force in the wheels which are in the non-braked states.

According to a second aspect and feature of the present invention, in addition to the first feature, the operations of the actuators are controlled, such that all of desired braking forces are exhibited in the wheel brakes in one of the axles at the initial stage, and braking forces resulting from distribution of the desired braking forces are exhibited in all of the wheel brakes after the initial stage.

With the second feature of the present invention, a variation can be prevented from being generated in vehicle deceleration, while preventing a wheel grip force from reaching a limit, thereby providing a smooth deceleration.

The above and other objects, features and advantages of the invention will become apparent from the following description of the preferred embodiment taken in conjunction with the accompanying drawings.

DETAILED DESCRIPTION OF THE PREFERRED EMBODIMENT

The present invention will now be described by way of a preferred embodiment with reference to the accompanying drawings.

Figure 1:
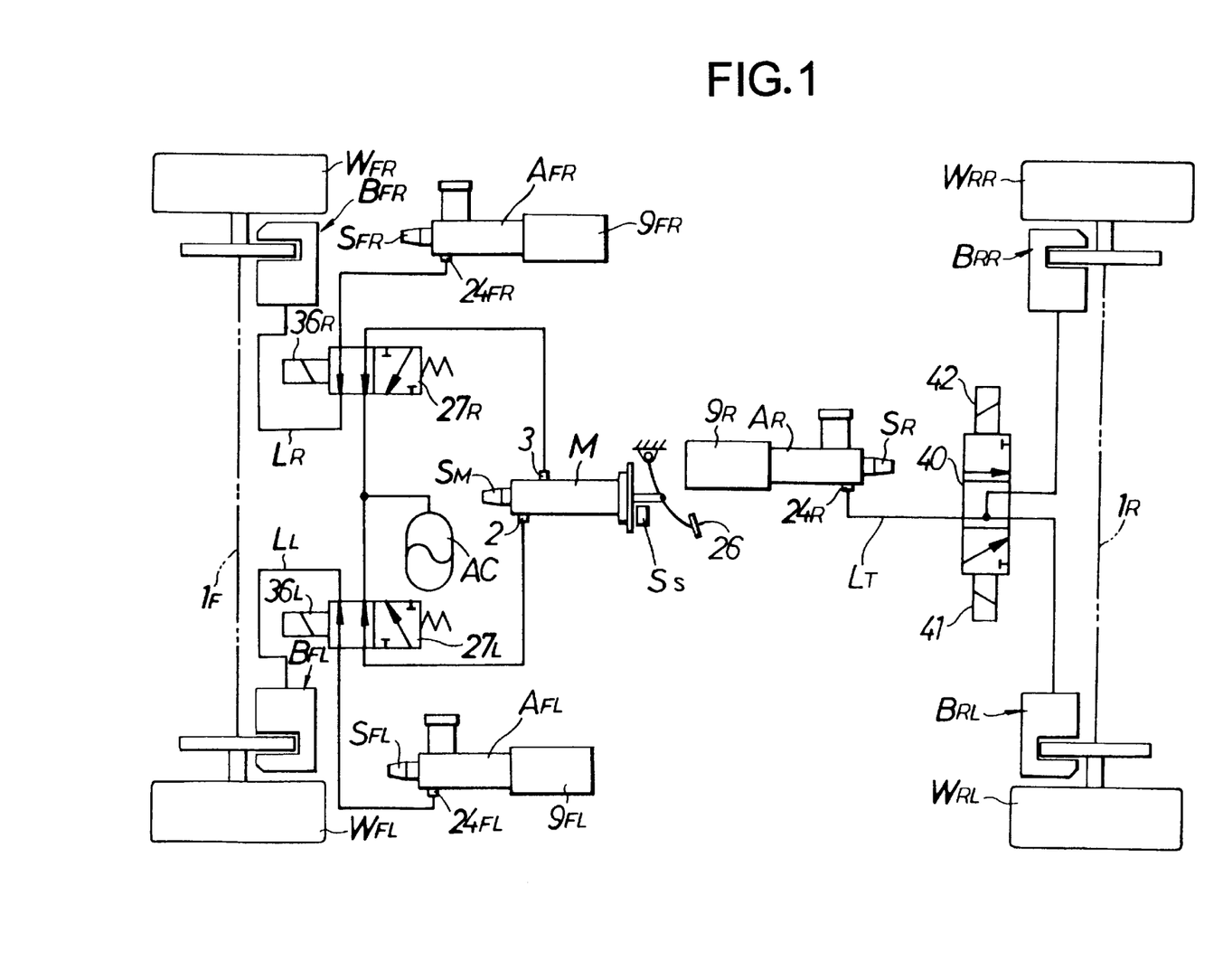
FIG. 1 is a diagrammatic illustration of braking liquid pressure circuits according to an embodiment of the present invention.

Referring first to FIG. 1, a left front wheel brake $B_{FL}$ and a right front wheel brake $B_{FR}$ are mounted on a left front wheel $W_{FL}$ and a right front wheel $W_{FR}$ on opposite side of a front axle $1_F$ of a front wheel drive type automobile vehicle. A left rear wheel brake $B_{RL}$ and a right rear wheel brake $B_{RR}$ are mounted on a left rear wheel $W_{RL}$ and a right rear wheel $W_{RR}$ on opposite side of a rear axle $1_R$. A brake system in the vehicle includes a left braking pressure circuit $L_L$, a right braking pressure circuit $L_R$ and a collective braking pressure circuit $L_T$. The left braking pressure circuit $L_L$ is constructed in a manner that a left front wheel actuator $A_{FL}$ and a first output port 2 of a tandem type master cylinder M are switchably connected to the left front wheel brake $B_{FL}$. The right braking pressure circuit $L_R$ is constructed in a manner that a right front wheel actuator $A_{FR}$ and a second output port 3 of the tandem type master cylinder M are switchably connected to the right front wheel brake $B_{FR}$. The collective braking pressure circuit $L_T$ is constructed in a manner than a rear wheel actuator $A_R$ is connected to the left and right rear wheel brakes $B_{RL}$ and $B_{RR}$.

Figure 2:
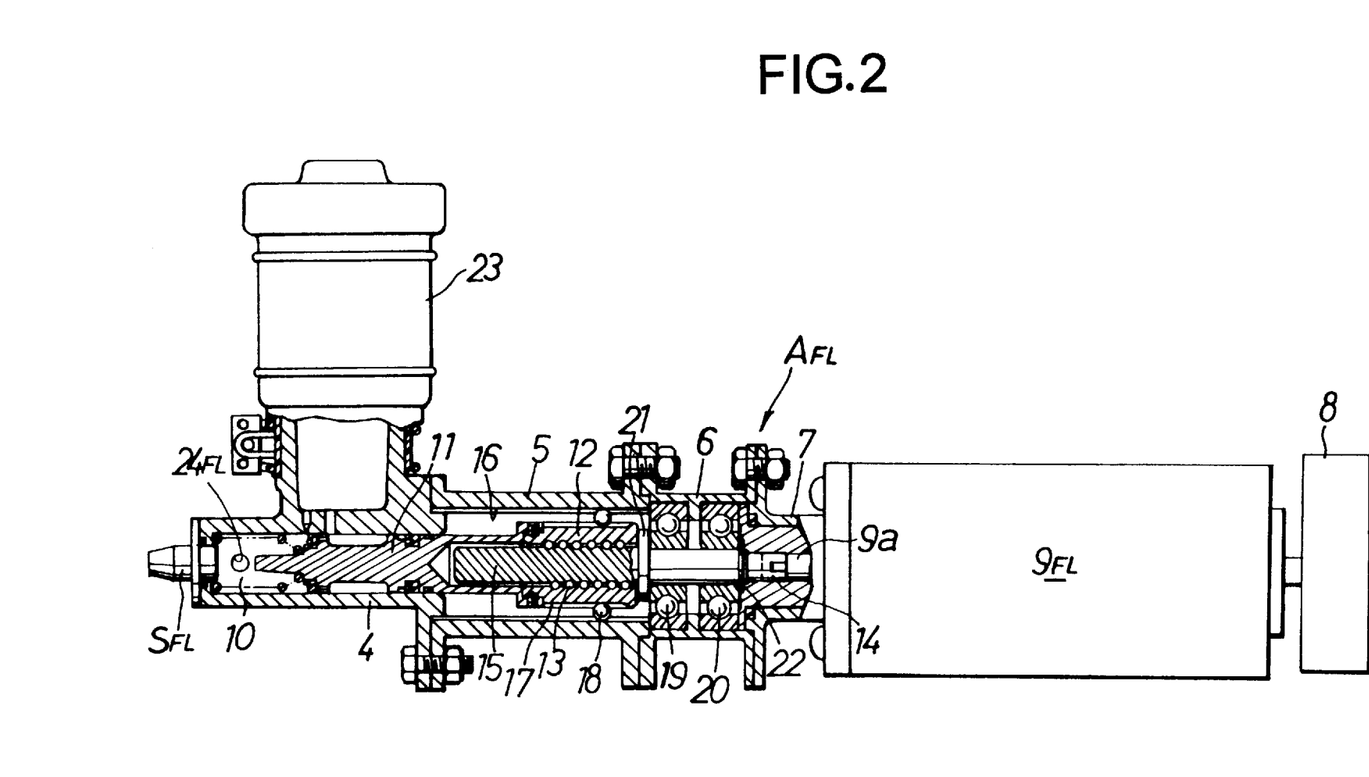
FIG. 2 is a vertical sectional view of an actuator.

Referring to FIG. 2, the left front wheel actuator $A_{FL}$ includes a cylinder 4 formed into a bottomed cylindrical shape with a tip end as a closed end, a guide sleeve 5 coaxially connected to a rear end of the cylinder 4, a support sleeve 6 coaxially connected to the guide sleeve 5, a connecting sleeve 7 coaxially connected to the support sleeve 6, a motor $9_{FL}$ coaxially connected to the support sleeve 6, a piston 11 slidably received in the cylinder 4 to define a pressure chamber 10 between the piston 11 and the closed end of the cylinder 4, a cylindrical nut member 12 disposed within the guide sleeve 5 for inhibited rotation about an axis and coaxially connected to a rear end of the piston 11, and a rotary shaft 15 coupled to the nut member 12 through a ball screw 13 and connected to an output shaft 9a of the motor through an Oldham joint 14.

Pluralities of axially extending grooves 16 and 17 are provided in a mutually corresponding relation in an inner surface of the guide sleeve 5 and an outer surface of the nut member 12, and a ball 18 is fitted in the mutually corresponding grooves, respectively, thereby inhibiting the rotation of the nut member 12 and thus the piston 11 about its axis. The rotary shaft 15 is rotatably carried in the support sleeve 6 with a pair of ball bearings 19 and 20 interposed therebetween. A collar 21 is provided on the rotary shaft 15 to protrude radially outwards, and a retaining ring 22 is fitted over the rotary shaft 15. Thus, by engagement of the collar 21 and the retaining ring 22 with axially outer ends of inner races in the ball bearings 19 and 20, the axial movement of the rotary shaft 15 is inhibited.

A reservoir 23 is mounted above the cylinder 4, such that a braking fluid can be supplemented therefrom into the pressure chamber 10 and returned thereto from the pressure chamber 10. Further, an output port $24_{FL}$ leading to the pressure chamber 10 is provided in the cylinder 4 and connected to the left braking pressure circuit $L_L$. Moreover, a left front wheel pressure sensor $S_{FL}$ is mounted to the closed end of the cylinder 4 for detecting a liquid pressure in the pressure chamber 10, i.e., a braking pressure for the left front wheel brake $B_{FL}$ in a state in which the output port $24_{FL}$ is in communication with the left front wheel brake $B_{FL}$.

In such left front wheel actuator $A_{FL}$, the piston 11 is axially reciprocally moved by the ball screw 13 in response to the normal and reverse rotations of the motor $9_{FL}$, such that a corresponding liquid pressure is generated in the pressure chamber 10.

The right front wheel actuator $A_{FR}$ and the rear wheel actuator $A_R$ have the same construction as the left front wheel actuator $A_{FL}$ and hence, the detailed description thereof is omitted. In the right front wheel actuator $A_{FR}$, a liquid pressure depending upon the amount of motor $9_{FR}$ rotated is outputted through an output port $24_{FR}$ and detected by a right front wheel pressure sensor $S_{FR}$. In the rear wheel actuator $A_R$, a liquid pressure depending upon the amount of motor $9_R$ rotated is outputted through an output port $24_R$ and detected by a rear wheel pressure sensor $S_R$.

Referring again to FIG. 1, the tandem type master cylinder M is of a well-known type which outputs a liquid pressure depending upon the amount of brake pedal 26 depressed through the first and second output ports 2 and 3. The tandem type master cylinder M is provided with a stroke sensor $S_S$ for detecting a pedal stroke of the brake pedal 26, and a pressure sensor $S_M$ for detecting an output liquid pressure from the first output port 2, which corresponds to a depression force on the brake pedal 26.

A fail-safe solenoid switch-over valve $27_L$ is incorporated in the left braking pressure circuit $L_L$ and capable of being switched over between a state in which it permits the output port $24_{FL}$ of the left front wheel actuator $A_{FL}$ to be put into communication with the left front wheel brake $B_{FL}$ upon energization of a solenoid $36_L$ and at the same time, permits the first output port 2 of the master cylinder M to be put into communication with an accumulator AC, and a state in which it permits the output port $24_{FL}$ of the left front wheel actuator $A_{FL}$ and the left front wheel brake $B_{FL}$ to be put out of communication with each other and at the same time, permits the first output port 2 of the master cylinder M to be put into communication with the left front wheel brake $B_{FL}$ upon deenergization of the solenoid $36_L$.

Figure 3:
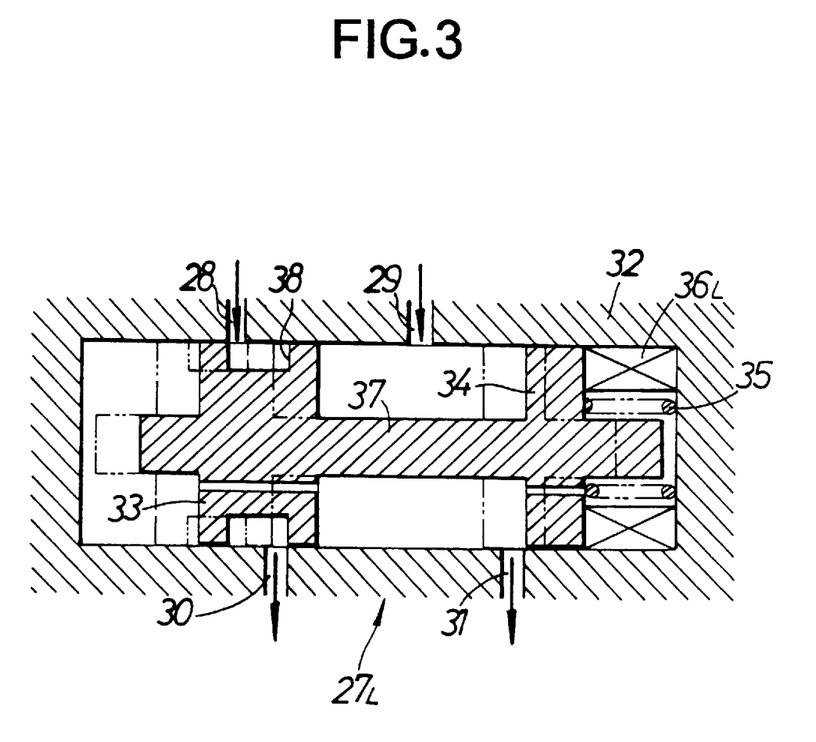
FIG. 3 is a vertical sectional view of a fail-safe solenoid valve.

Referring to FIG. 3, the fail-safe solenoid switch-over valve $27_L$ includes a housing 32 which has a first input port 28 leading to the output port $24_{FL}$ of the left front wheel actuator $A_{FL}$, a second input port 29 leading to the first output port 2 of the master cylinder M, a first output port 30 leading to the left front wheel brake $B_{FL}$ and a second output port 31 leading to the accumulator AC; first and second valve disks 33, 34 coaxially operatively connected to each other and slidably connected within the housing 32; a return spring 35 interposed between the second valve disk 34 and the housing 32 to exhibit a spring force for biasing the valve disks 33 and 34 in an axially one direction; and the solenoid $36_L$ accommodated in the housing 32 to exhibit a electromagnetic force for attracting the valve disks 33 and 34 in the axially other direction against the spring force of the return spring 35 upon energization thereof.

The first and second valve disks 33 and 34 are coaxially connected to each other by a connecting shaft 37. An annular groove 38 is provided in an outer surface of the first valve disk 33, such that it is normally in communication with the first input port 28. The annular groove 38 is adapted to be put into communication with the first output port 30, as shown by a solid line in FIG. 3, upon energization of the solenoid $36_L$, but to be put out of communication with the first output port 30, as shown by a dashed line in FIG. 3, upon deenergization of the solenoid $36_L$. Further, the distance between the first and second valve disks 33 and 34 is set such that upon energization of the solenoid $36_L$, the second input port 29 and the first output port 30 are put out of communication with each other by the valve disk 33 and at the same time, the second input port 29 and the second output port 31 are put into communication with each other, as shown by the solid line in FIG. 3, and upon deenergization of the solenoid $36_L$, the first input port 29 and the second output port 31 are put out of communication with each other by the valve disk 34 and at the same time, the second input port 29 and the first output port 30 are put into communication with each other, as shown by the dashed line.

The solenoid valve $36_L$ of the fail-safe solenoid switch-over valve $27_L$ is energized in response to the start of an engine mounted on the vehicle. In a usual state, the solenoid $36_L$ is in an energized state, such that an output liquid pressure from the left front wheel actuator $A_{FL}$ can be transmitted to the left front wheel brake B, and an output pressure from the master cylinder M is absorbed to the accumulator AC. If the solenoid $36_L$ is deenergized, the fail-safe solenoid switch-over valve $27_L$ permits the output liquid pressure from the master cylinder M to be transmitted to the left front wheel brake $B_{FL}$. Therefore, when the left front wheel brake $B_{FL}$ is fallen into failure, the output liquid pressure from the master cylinder M can be applied to the left front wheel brake $B_{FL}$ to assure a braking force by deenergizing the solenoid $36_L$ of the fail-safe solenoid switch-over valve $27_L$.

A fail-safe solenoid switch-over valve $27_R$ having the basically same construction as the fail-safe solenoid switch-over valve $27_L$ is incorporated in the right braking pressure circuit $L_R$. The fail-safe solenoid switch-over valve $27_R$ is capable of being switched over between a state in which it permits the output port $24_{FR}$ of the right front wheel actuator $A_{FR}$ to be put into communication with the right front wheel brake $B_{FR}$ and at the same time, it permits the second output port 3 of the master cylinder M to be put into communication with the accumulator AC common with the solenoid switch-over valve $27_{FL}$, upon energization of a solenoid $36_R$, and a state in which it permits the output port $24_{FR}$ of the right front wheel actuator $A_{FR}$ and the right front wheel brake $B_{FR}$ to be put out of communication with each other and at the same time, it permits the second output port 3 of the master cylinder M to be put into communication with the right front wheel brake $B_{FR}$ upon deenergization of the solenoid $36_R$.

A shut-off valve 40 is incorporated in the collective braking pressure circuit $L_T$. The shut-off valve 40 is a three-port and three-position solenoid switch-over control valve which is capable of being switched over between a neutral position in which upon deenergization of solenoids 41 and 42, it permits a liquid pressure outputted through the output port $24_R$ of the rear wheel actuator $A_R$ to be transmitted to the left and right rear wheel brakes $B_{RL}$ and $B_{RR}$; a position (an upper position in FIG. 1) in which, when the solenoid 41 is energized with the solenoid 42 left deenergized, it permits the output liquid pressure from the output port $24_R$ to be transmitted to the left rear wheel brake $B_{RL}$, but blocks the transmission of such output liquid pressure to the right rear wheel brake $B_{RR}$; and a position (a lower position in FIG. 1) in which, when the solenoid 42 is energized with the solenoid 41 left deenergized, it permits the output liquid pressure from the output port $24_R$ to be transmitted to the right rear wheel brake $B_{RR}$, but blocks the transmission of such output liquid pressure to the left rear wheel brake $B_{RL}$.

Figure 4:
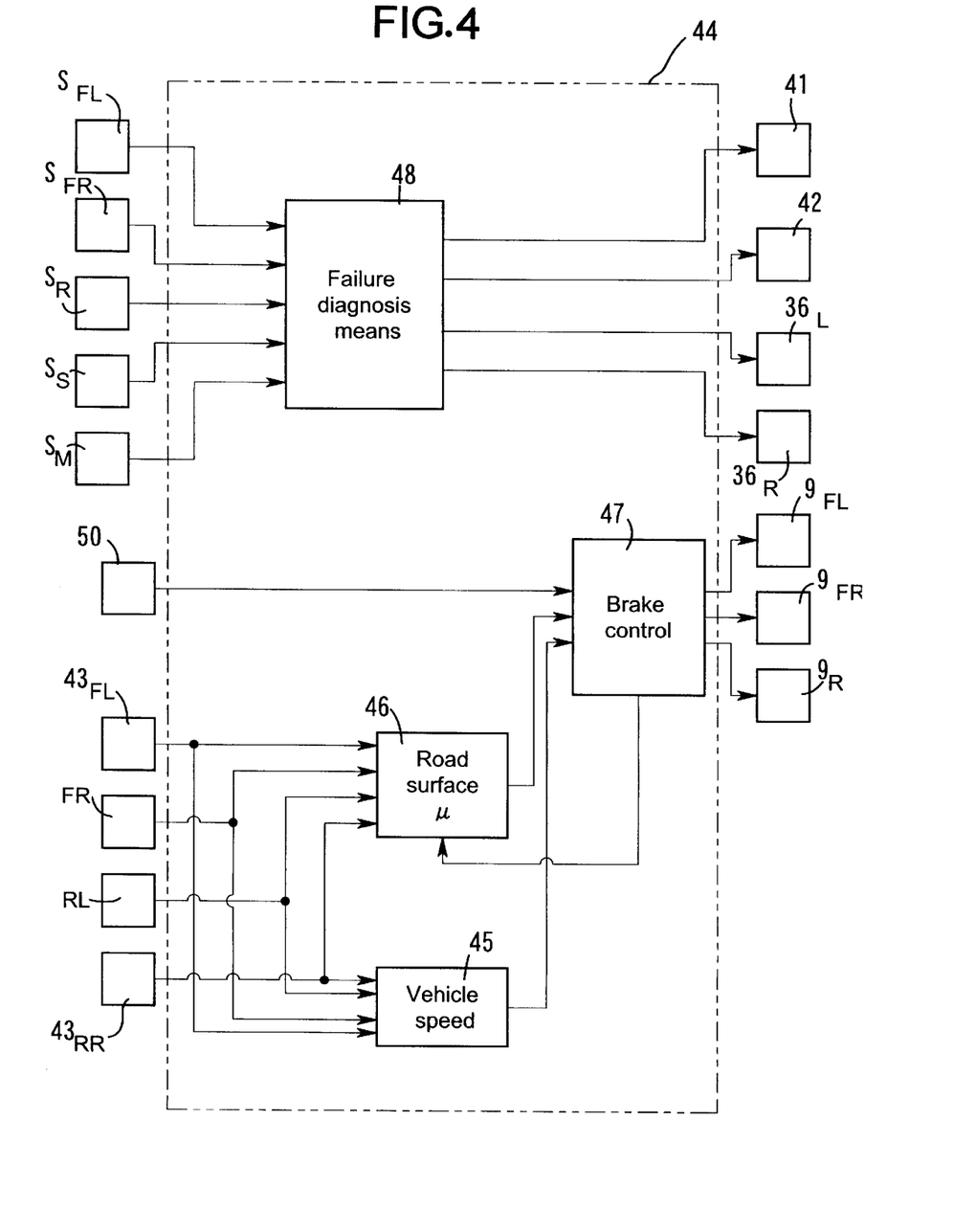
FIG. 4 is a block diagram schematically illustrating the arrangement of a controller.

Referring to FIG. 4, the solenoid $36_L$ of the fail-safe solenoid switch-over valve $27_L$ in the left braking pressure circuit $L_L$, the solenoid $36_R$ of the fail-safe solenoid switch-over valve $27_R$ in the right braking pressure circuit $L_R$, the solenoids 41 and 42 of the shut-off valve 40 in the collective braking pressure circuit $L_T$ and the motors $9_{FL}$, $9_{FR}$ and $9_R$ of the actuators $A_{FL}$, $A_{FR}$ and $A_R$ are controlled by a controller 44. The controller 44 includes a vehicle speed detecting means 45, a friction coefficient determining means 46, a brake control means 47, and a failure diagnosis means 48.

The vehicle speed detecting means 45 detects a vehicle speed based on detection values detected by wheel speed detectors $43_{FL}$, $43_{FR}$, $43_{RL}$ and $43_{RR}$ mounted to a left front wheel $W_{FL}$, a right front wheel $W_{FR}$, a left rear wheel $W_{RL}$ and a right rear wheel $W_{RR}$, respectively.

The brake control means 47 determines whether each of the wheel brakes $B_{FL}$, $B_{FR}$, $B_{RL}$ and $B_{RR}$ should be automatically operated, based on a vehicle speed detected by the vehicle speed detecting means 45, a distance detected by a distance detector 50 such as a laser radar for detecting a distance as a motion parameter between the subject vehicle and another vehicle traveling ahead of the subject vehicle, and a result of determination of a friction coefficient of a travel road surface by the friction coefficient determining means 46, and controls the operation of each of the motor $9_{FL}$, $9_{FR}$ and $9_R$ in the actuators $A_{FL}$, $A_{FR}$ and $A_R$ in accordance with a result of such determination. Moreover, the brake control means 47 controls the operation of each of the motors $9_{FL}$, $9_{FR}$ and $9_R$ such that when it is determined that the brakes should be operated, all of desired braking forces of the wheel brakes $B_{FL}$ and $B_{FR}$ in one of front and rear axles $1_F$ and $1_R$, e.g., the front axle $1_F$, is exhibited at an initial state of the braking, and braking forces resulting from distribution of the desired braking forces are exhibited in all of the wheel brakes $B_{FL}$, $B_{FR}$, $B_{RL}$ and $B_{RR}$ after the initial stage.

The friction coefficient determining means 46 determines a friction coefficient of a travel road surface based on the detection values detected by the wheel speed detectors $43_{FL}$, $43_{FR}$, $43_{RL}$ and $43_{RR}$. The determination of the friction coefficient is carried out only when a determination command signal from the brake control means 47 has been inputted, and the brake control means 47 outputs the determination command signal at the initial state in which all of the desired braking forces are exhibited in the wheel brakes $B_{FL}$ and $B_{FR}$ in the front axle $1_F$.

Figure 5:
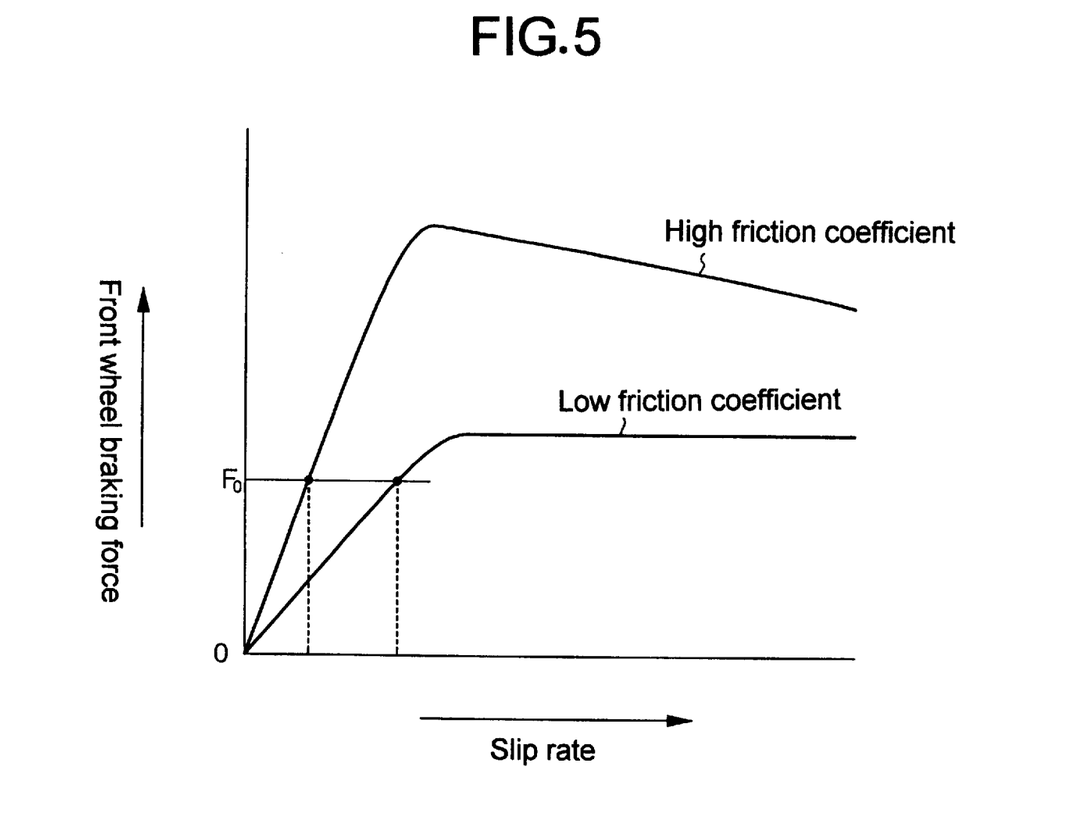
FIG. 5 is a graph illustrating the relationship between the slip rate and the front wheel braking force in accordance with the friction coefficient.

The determination of the friction coefficient in the friction coefficient determining means 46 is carried out based on the magnitude of a slip rate based on the wheel speeds of the left and right front wheels $W_{FL}$ and $W_{FR}$, for example, which are in their braked states, and the left and right rear wheels $W_{RL}$ and $W_{RR}$ which are in their non-braked states. Specifically, when the braking force of the left and right front wheels $W_{FL}$ and $W_{FR}$ is defined as $F_O$, if the friction coefficient is different, the slip rate is also different. Thus, the friction coefficient can be determined by the braking force of the left and right front wheels $W_{FL}$ and $W_{FR}$ and the slip rate.

The determination of the friction coefficient in the friction coefficient determining means 46 may be carried out based on an integration value of the slip rate or a variation rate in slip rate in addition to the magnitude of the slip rate, or based on the magnitude of a difference between the front and rear wheel speeds, or an integration value of such difference or a variation rate in such difference. Further, the determination of the friction coefficient in the friction coefficient determining means 46 may be carried out based on the magnitude of a deceleration of the wheels which are in their braked states, or an integration value of such deceleration or a variation rate in such deceleration.

Figure 6:
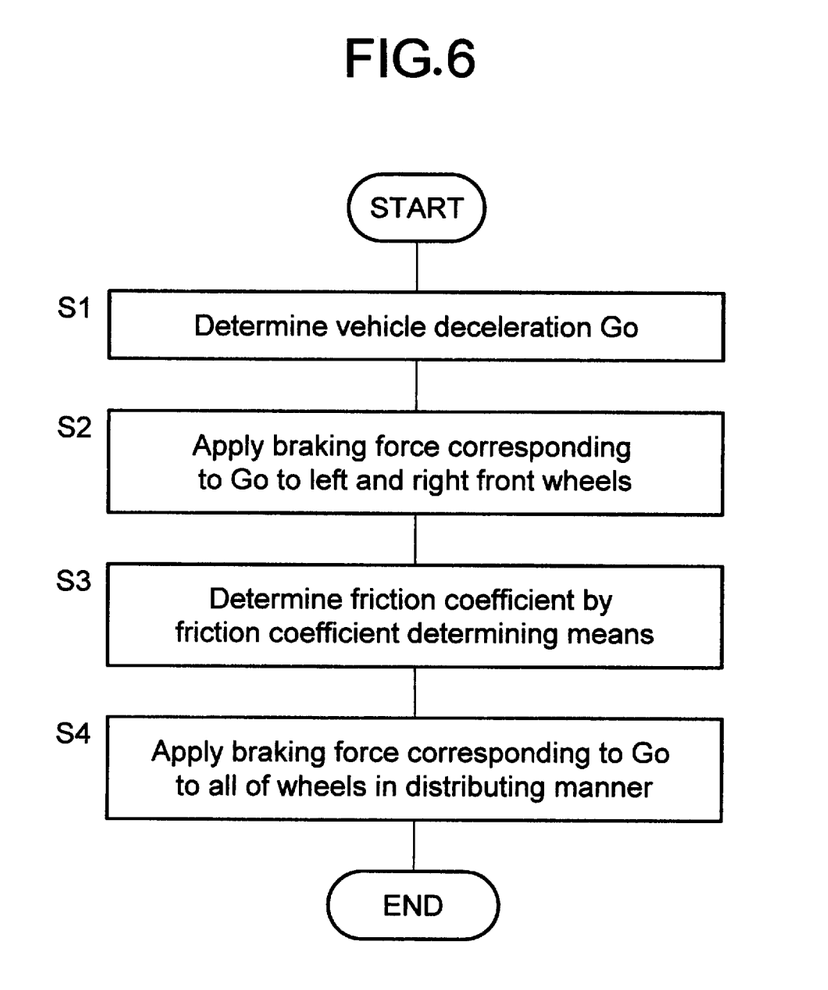
FIG. 6 is a flowchart illustrating a procedure for the friction coefficient determination and the brake control.

A procedure of processing by the brake control means 47 and the friction coefficient determining means 46 is as shown in FIG. 6. At first step S1, a vehicle deceleration $G_O$, for example, required for avoiding a collision of the subject vehicle against a vehicle traveling ahead of the subject vehicle, is set. At an initial state of braking, the actuators $A_{FL}$ and $A_{FR}$ are operated at second step S2 to exhibit a braking force $F_O$ determined in correspondence to the vehicle deceleration $G_O$ by the left and right wheel brakes $B_{FL}$ and $B_{FR}$, and the determination of a friction coefficient by the friction coefficient determining means 46 is carried out at third step S3. Then, at fourth step S4 after the initial stage, a required braking force $F_O$ is distributed to all of the wheel brakes $B_{FL}$, $B_{FR}$, $B_{RL}$ and $B_{RR}$, thereby operating the actuators $A_{FL}$, $A_{FR}$, $A_{RL}$ and $A_{RR}$.

Referring again to FIG. 4, the following detection values are inputted to the failure diagnosis means 48: the detection value detected by the left front wheel pressure sensor $S_{FL}$ for detecting the liquid pressure in the left braking pressure circuit $L_L$, the detection value detected by the right front wheel pressure sensor $S_{FR}$ for detecting the liquid pressure in the right braking pressure circuit $L_R$, the detection value detected by the rear wheel pressure sensor $S_R$ for detecting the liquid pressure in the collective braking pressure circuit $L_T$ and the detection values detected by the stroke sensor $S_S$ and the pressure sensor $S_M$ mounted to the master cylinder M. The failure diagnosis means 48 determines a failure by determining whether braking pressures have been obtained by the detection values detected by the pressure sensors $S_{FL}$, $S_{FR}$ and $S_R$, when it is determined that a braking operation has been performed by signals from the stroke sensor $S_S$ and the pressure sensor $S_M$. Moreover, when it is determined that the left front wheel actuator $A_{FL}$ in the left braking pressure circuit $L_L$ is in failure, the solenoid $36_L$ of the fail-safe solenoid switch-over valve $27_L$ is deenergized by the failure diagnosis means 48. When it is determined that the right front wheel actuator $A_{FR}$ in the right braking pressure circuit $L_R$ is in failure, the solenoid $36_R$ of the fail-safe solenoid switch-over valve $27_R$ is deenergized by the failure diagnosis means 48. This causes the first output port 2 and the left front wheel brake $B_{FL}$ to be put into communication with each other in the left braking pressure circuit $L_L$, and causes the second output port 3 of the master cylinder M and the right front wheel brake $B_{FR}$ to be put into communication with each other in the right braking pressure circuit $L_R$. Therefore, even if both of the front wheel actuators $A_{FL}$ and $A_{FR}$ are fallen into failure, the liquid pressure can be assured by the master cylinder M which outputs the liquid pressure in response to the driver's operation.

Further, the failure diagnosis means 48 outputs a signal indicative of a command to switch over the deenergization and energization of both the solenoids 41 and 42 of the shut-off valve 40 in response to the fact that the integration value of the difference between the detection values detected by left and right front wheel pressure sensors $S_{FL}$ and $S_{FR}$ exceeds a predetermined value. When the detection value detected by the left front wheel pressure sensor $S_{FL}$ is larger, the solenoid 41 is left deenergized and the solenoid 42 is energized. When the detection value detected by the right front wheel pressure sensor $S_{FR}$ is larger, the solenoid 42 is left deenergized and the solenoid 41 is energized. Thus, when the liquid pressure in the left braking pressure circuit $L_L$ is larger than the liquid pressure in the right braking pressure circuit $L_R$, the shut-off valve 40 blocks the transmission of the liquid pressure from the rear wheel actuator $A_R$ to the left rear wheel brake $B_{RL}$, while maintaining the transmission of the liquid pressure from the rear wheel actuator $A_R$ to the right rear wheel brake $B_{RR}$ in the collective braking pressure circuit $L_T$. When the liquid pressure in the right braking pressure circuit $L_R$ is larger than the liquid pressure in the left braking pressure circuit $L_L$, the shut-off valve 40 blocks the transmission of the liquid pressure from the rear wheel actuator $A_R$ to the right rear wheel brake $B_{RR}$, while maintaining the transmission of the liquid pressure from the rear wheel actuator $A_R$ to the left rear wheel brake $B_{RL}$ in the collective braking pressure circuit $L_T$.

The operation of this embodiment will be described below. In operating the actuator $A_{FL}$ which controls the braking pressure for the left front wheel brake $B_{FL}$, the actuator $A_{FR}$ which controls the braking pressure for the right front wheel brake $B_{FR}$ and the actuator $A_R$ which controls the braking pressures for the left and right rear wheel brakes $B_{RL}$ and $B_{RR}$, the actuators $A_{FL}$ and $A_{FR}$ are operated at an initial stage of braking, such that all of braking forces required for only the wheel brakes $B_{FL}$ and $B_{FR}$ in the front axle $1_F$. Moreover, at an initial stage of the operation, the determination of the friction coefficient based on the detection values detected by the wheel speed detectors $43_{FL}$, $43_{FR}$, $43_{RL}$ and $43_{RR}$ is carried out by the friction coefficient determining means 46 and hence, in a condition in which a variation in behavior of the left and right front wheels $W_{FL}$ and $W_{FR}$ is increased as a result of application of the braking forces only to the left and right front wheels $W_{FL}$ and $W_{FR}$, the determination of the friction coefficient can be performed relatively easily.

Moreover, by applying the braking forces only to the left and right front wheels $W_{FL}$ and $W_{FR}$, the left and right rear wheels $W_{RL}$ and $W_{RR}$ which are follower wheels can be maintained in their non-braked states to assure a lateral force to assure a stability of the vehicle, but also to enable the wheel speeds of the left and right rear wheels $W_{RL}$ and $W_{RR}$ to be used as reference values for determination of the friction coefficient.

After the initial stage of the braking, the actuators $A_{FL}$, $A_{FR}$ and $A_R$ in a manner that all of the required braking forces are distributed to all of the wheel brakes $B_{FL}$, $B_{FR}$, $B_{RL}$ and $B_{RR}$. Thus, before grip forces of the wheels $W_{FL}$ and $W_{FR}$ in the front axle $1_F$ reach their limits, the braking forces can be exhibited even in the left and right rear wheel brakes $B_{RL}$ and $B_{RR}$, thereby preventing a variation from being produced in vehicle deceleration during braking.

In the above-described embodiment for the front wheel drive type vehicle, the wheel speeds of the left and right rear wheels $W_{RL}$ and $W_{RR}$ which are the follower wheels are used intact as reference values. In a rear wheel drive type vehicle, however, when only left and right front wheels $W_{FL}$ and $W_{FR}$ are braked, it is required that a transmission is maintained in a neutral state such that an influence from an engine is not exerted to left and right rear wheels $W_{RL}$ and $W_{RR}$, when the wheel speeds of the left and right rear wheels $W_{RL}$ and $W_{RR}$ are used as reference values.

Although the embodiment of the present invention has been described in detail, it will be understood that the present invention is not limited to the above-described embodiment, and various modifications may be made without departing from the spirit and scope of the invention defined in claims.

For example, braking forces can be exhibited in the wheel brakes in the rear axle at the initial stage of braking. The present invention is also applicable to a vehicle in which a liquid pressure is generated from a mater cylinder having a negative pressure booster controlled by an electronic control unit irrespective of a driver's intention, and the braking pressure is regulated by the actuators individually corresponding to the wheels.

What is claimed is:

1. A brake control method in a vehicle including a plurality of axles including front and rear axles on which wheels are mounted at opposite ends thereof, respectively, wheel brakes mounted to said wheels, wheel speed detectors for detecting wheel speeds of said wheels, actuators for operating the wheel brakes, and a friction coefficient determining means for determining a friction coefficient of a travel road surface based on detection values detected by said wheel speed detectors, said brake control method comprising the steps of:

when each of said wheels is braked, controlling the operations of said actuators such as to generate braking forces only in the wheel brakes in one of the axles at least at an initial stage of the braking;

determining the friction coefficient, by the friction coefficient determining means, at said initial stage; and applying a braking force to all wheels after termination of said initial stage.

2. A brake control method in a vehicle according to claim 1, wherein the step of controlling said actuators includes the steps of exhibiting all of desired braking forces in the wheel brakes in one of the axles at said initial stage of the braking, and exhibiting braking forces resulting from distribution of the desired braking forces in all of the wheel brakes after said initial stage.

3. A brake control method in a vehicle according to claim 2, further comprising the step of determining said friction coefficient by said friction coefficient determining means by using a comparison between the detection values detected by said wheel speed detectors for the wheels on said front axle and the detection values detected by said wheel speed detectors for the wheels on said rear axle.

4. A brake control method in a vehicle according to claim 1, further comprising the step of determining said friction coefficient by said friction coefficient determining means by using a comparison between the detection values detected by said wheel speed detectors for the wheels on said front axle and the detection values detected by said wheel speed detectors for the wheels on said rear axle.

* * * * *